United States Patent [19]

Davis et al.

[11] Patent Number: 4,991,881
[45] Date of Patent: Feb. 12, 1991

[54] VALVE FLANGE RETAINMENT SYSTEM

[75] Inventors: James R. Davis; Melvin L. Osgood, both of Marshalltown, Iowa

[73] Assignee: Fisher Controls International, Inc., Clayton, Mo.

[21] Appl. No.: 378,405

[22] Filed: Jul. 10, 1989

[51] Int. Cl.⁵ ............................................. F16L 25/00
[52] U.S. Cl. ..................................... 285/330; 285/414
[58] Field of Search ................ 285/404, 330, 419, 90, 285/87, 368, 412, 413, 414, 415; 403/356, 362, 375

[56] References Cited

U.S. PATENT DOCUMENTS

| 1,186,021 | 6/1916 | Metzger . | |
|---|---|---|---|
| 1,186,621 | 6/1916 | Townsend . | |
| 1,307,160 | 6/1919 | Stokes | 285/330 X |
| 1,881,508 | 10/1932 | Gredell . | |
| 1,914,736 | 6/1933 | Coutu | 285/92 X |
| 2,472,307 | 6/1949 | Nagel | 88/1 |
| 3,026,128 | 3/1962 | Willis | 285/18 |
| 3,091,487 | 5/1963 | Gallagher et al. | 287/130 |
| 3,418,009 | 12/1968 | Pollia | 285/368 X |
| 3,468,572 | 9/1969 | Haentjens | 278/129 |
| 3,768,843 | 10/1973 | Burtis | 285/114 |
| 3,966,234 | 6/1976 | Sundholm | 285/24 |
| 4,648,630 | 3/1987 | Bruch | 285/87 |
| 4,660,266 | 4/1987 | Horn | 29/417 |
| 4,767,138 | 8/1988 | Schafbuch | 285/368 |
| 4,779,900 | 10/1988 | Shumard | 285/114 |

FOREIGN PATENT DOCUMENTS

| 2242969 | 3/1973 | Fed. Rep. of Germany | 285/415 |
|---|---|---|---|
| 932078 | 5/1982 | U.S.S.R. | 285/412 |
| 563581 | 8/1944 | United Kingdom | 285/90 |

Primary Examiner—Dave W. Arola
Attorney, Agent, or Firm—Nicholas A. Camasto; Dale A. Kubly; Arnold H. Cole

[57] ABSTRACT

A separable flange retainment system includes a first boss on the flange and a mating second boss on a valve body. The boss on the valve body has a threaded aperture for reception of a suitable fastener. A generally U shaped retainer device having an orifice in its bight portion straddles the bosses and is secured in position by the fastener. The retainer device precludes lateral and rotational movement between the flange and the body.

5 Claims, 2 Drawing Sheets

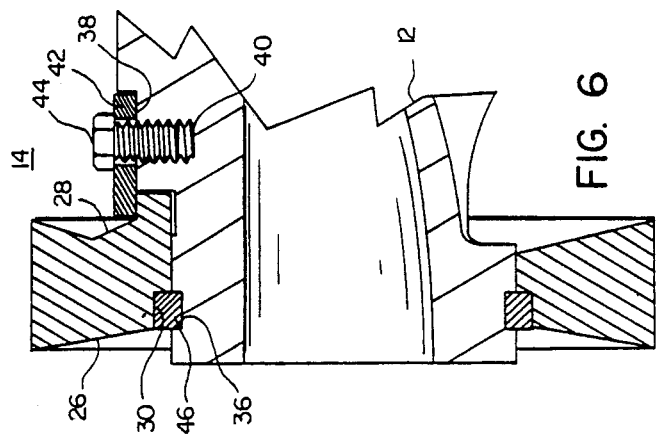
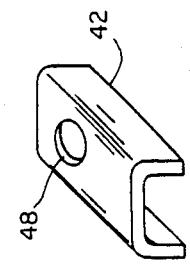
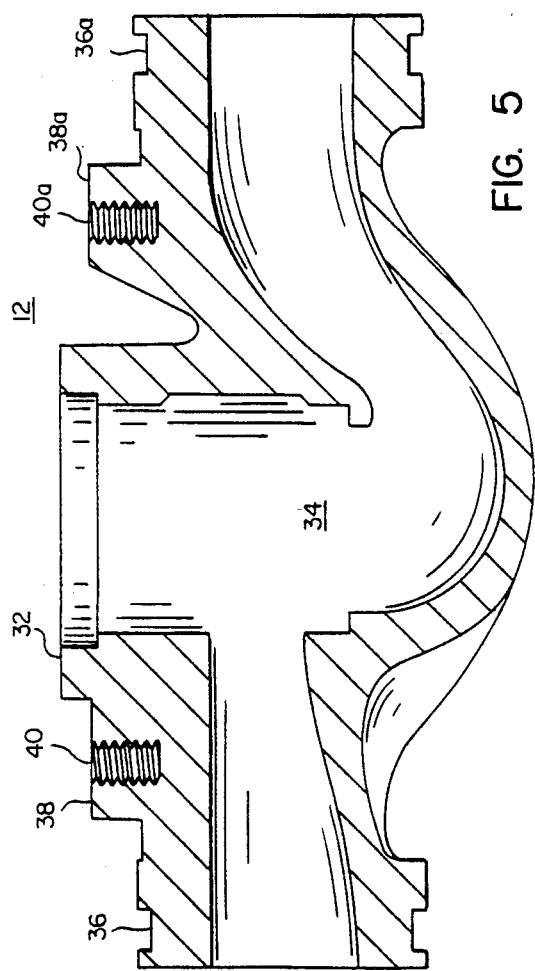
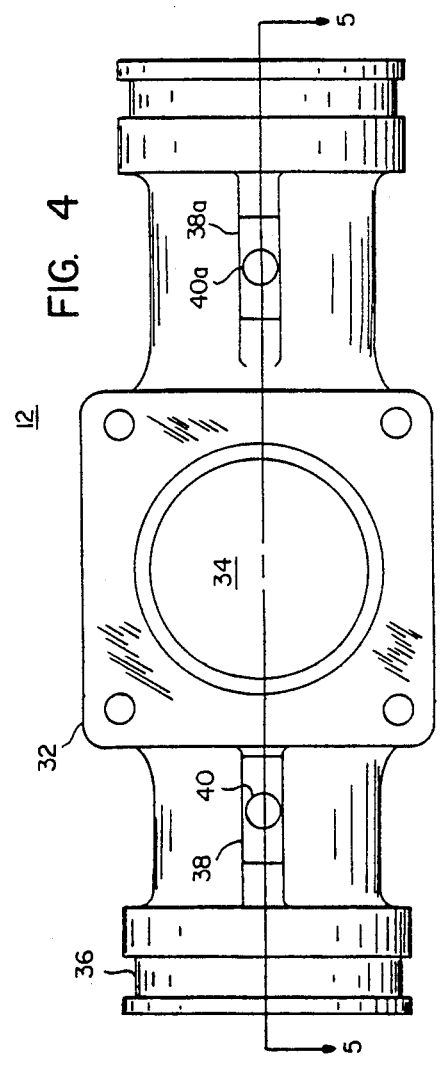

VALVE FLANGE RETAINMENT SYSTEM

BACKGROUND OF THE INVENTION AND PRIOR ART

This invention is generally concerned with pipeline devices that are flange mounted and specifically with such devices that have loosely secured flanges. As is well known, flanges are utilized to secure valve bodies, pipes and the like in an abutting relationship in pipeline systems. Flanges are generally categorized as integral or separable depending upon whether they are an integral part of the valve body or pipe assembly or are separate and loosely attached thereto. The invention is directed to separable flanges which are generally required to be laterally and rotationally movable with respect to the pipeline assembly or valve body for installation purposes. Such flanges may be secured to their valve body by any number of well known means, including split retention rings that nest in suitable retention grooves.

In U.S. Pat. No. 4,767,138, a novel hubless flange is described and claimed. That flange is secured to a pipeline device by means of a split ring and a retention groove in the device. The retainment system of the invention is described in connection with that flange and a suitable valve body, but it should be understood that other types of pipeline devices and flanges may also benefit from the invention.

A difficult problem is that in installing heavy valves and other pipeline devices, there is a need for a number of people to guard against the parts slipping or rotating while the line bolting is being installed. Prior art flanges require three or more people to assure a degree of safety in working on such heavy pipeline equipment. Another consideration is the need to retain the capability of changing flange gaskets in the field which requires that the separable flange be laterally moved on the pipeline device or valve body. This need for lateral movement is a detriment during installation and the ability of the separable flange mechanism to laterally move also contributes to safety concerns.

With the retainment system of the invention, a simple low cost arrangement is provided for securing the separable flange from both lateral and rotational movement with respect to the body of the pipeline device.

OBJECTS OF THE INVENTION

A principal object of the invention is to provide an improved separable flange arrangement.

Another object of the invention is to provide a valve body and separable flange arrangement of novel construction.

A further object of the invention is to provide a novel retainment system for securing a separable flange to a valve body or the like.

BRIEF DESCRIPTION OF THE DRAWINGS

These and other objects and advantages of the invention will be apparent upon reading the following description in conjunction with the drawings in which:

FIG. 4 is a plan view of a valve body constructed in accordance with the invention;

FIG. 5 is a sectional view of the valve body of FIG. 4 taken along the line 5—5;

FIG. 6 is a partial view showing the retainment system of the invention; and

FIG. 7 is a perspective view of a retainer device constructed in accordance with the invention.

DESCRIPTION OF THE PREFERRED EMBODIMENT

Figure 1:
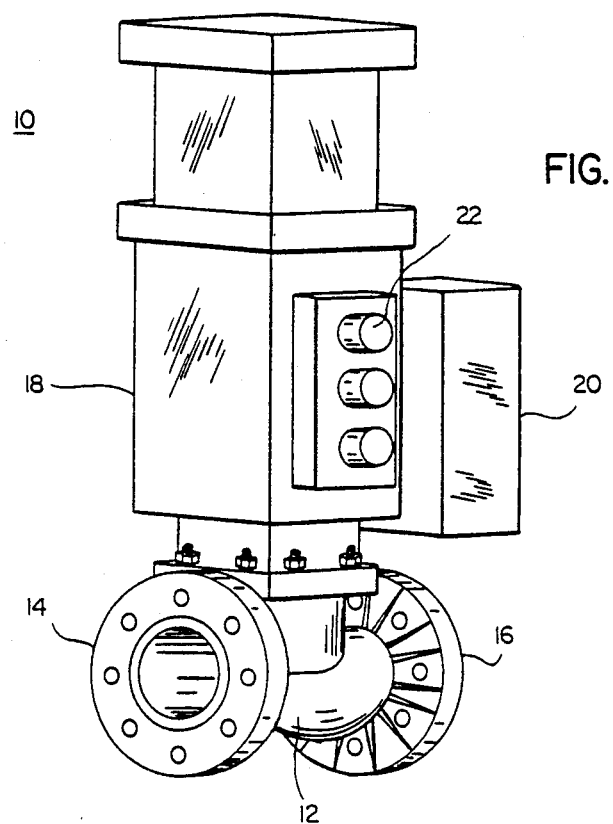
FIG. 1 is a perspective view of a prior art combination actuator, positioner and valve body having separable flanges.

In FIG. 1, a prior art valve assembly 10 includes a valve body 12, a pair of separable flanges 14 and 16, an actuator 18 and a positioner 20. A plurality of gauges 22 are also illustrated. Assembly 10 is well known in the prior art and as can be seen, is a relatively heavy massive structure that gives rise to some difficulty in installation since the separable flanges 14 and 16 are loosely retained on valve body 12.

Figure 2:
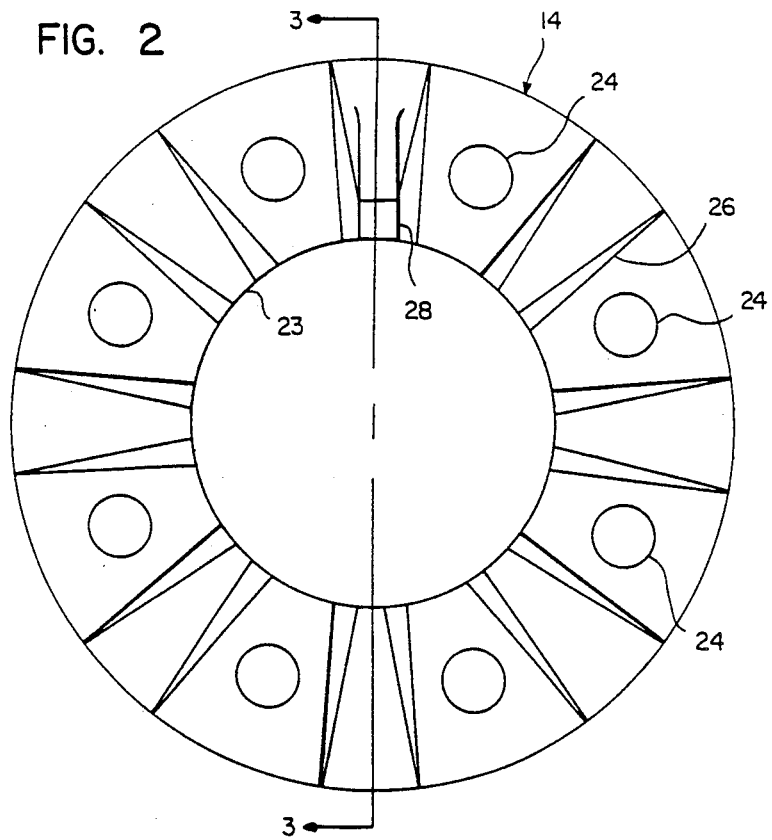
FIG. 2 is a plan view of a separable flange constructed in accordance with the invention.
Figure 3:
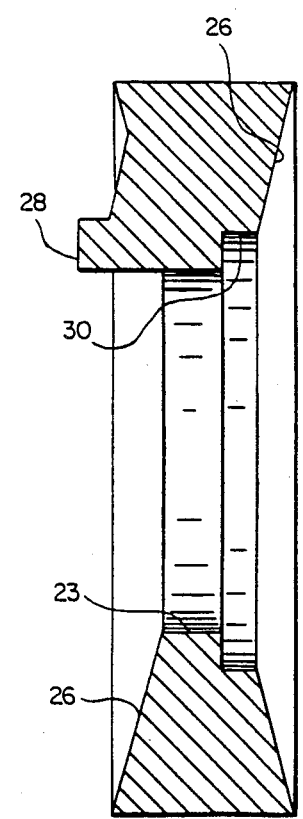
FIG. 3 is a sectional view of the flange of FIG. 2 taken along the line 3—3.

The separable flange shown in FIG. 2 is identical to that described and claimed in the above referenced U.S. patent with the exception of a generally rectangular boss 28 on one side. Viewing FIG. 2 in conjunction with FIG. 3, the flange 14 is annular and includes an inner orifice 23 that is sized to slip over the end of a pipe fitting or valve body. Flange 14 generally has an outwardly tapered cross section as indicated at 26, for strain equalization. An undercut portion 30 is provided in one side of flange 14 for engaging a split ring retainer to secure the flange on the pipeline fitting or valve body. Boss 28 may be either formed as part of flange 14 or added thereto by welding or the like.

In FIG. 4 the general configuration of the valve body 12 is shown. An integral mounting flange 32 for mounting the valve body to an actuator is shown and a valve chamber 34 is also indicated. A pair of retention grooves 36 and 36a are located at each end of valve body 12 for securing separable flanges thereto by means of split ring retention devices, (not shown). A pair of generally rectangular bosses 38 and 38a are formed on body 12 adjacent retention grooves 36 and 36a, respectively. The respective bosses 38 and 38a have threaded holes 40 and 40a formed therein. Bosses 38 and 38a may of course, be separate from valve body 12 and attached thereto by any suitable means of attachment such as welding, rather than being integrally formed, as shown.

In FIG. 6, flange 14 is shown assembled to one end of body 12. Specifically, the action of split retention ring 46 in securing the flange to the body is shown. Split ring 46 nests in retention groove 36 and is maintained therein by flange 14. Undercut portion 30 precludes removal of flange 14 from body 12 by virtue of split retention ring 46 and retention groove 36.

A generally U shaped retainer 42 of heavy construction is illustrated in FIG. 7 and shown in cross section in FIG. 6. Retainer 42 includes an aperture 48 in its bight portion for enabling it to be secured to boss 38 by means of a screw or bolt 44. Since the retainer 42 straddles the bosses 28 and 38, it not only prevents relative rotational movement between flange 14 and body 12 but it also prevents lateral movement of flange 14 with respect to body 12. This is due to the very limited clearance between the ends of the bosses 28 and 38 when the bosses are in alignment. Therefore, with a single fastener, flange 14 is locked in position on body 12. It will be appreciated that removal of bolt 44 and retainer 42 will permit rotation of flange 14 with respect to body 12. By rotating flange 14 approximately 30 degrees, it can be moved laterally (to the right as viewed in FIG. 6) on body 12 to permit removal of the split retention ring 46, should that be required. During normal work on a pipeline, it is sometimes required to replace one or more flange gaskets. In that instance, the flange needs to be moved laterally to permit access to the gasket. As has been shown, this can be readily accomplished with the retainer system of the invention.

What has been described is a novel loose flange retainment system for precluding inadvertent movement of the flange on a valve body or pipeline device. It is recognized that numerous changes and modifications in the described embodiment of the invention will be apparent to those skilled in the art without departing from its true spirit and scope. The invention is to be limited only as defined in the claims.

What is claimed is:

1. In combination:
   a pipeline device having a body defining a circumferential groove;
   a split ring positioned in said groove;
   a loosely mounted flange secured to said body by said split ring; and
   removable means engaging both said flange and said body for securing said flange in position on said body, said removable means precluding both lateral and rotational movements between said body and said flange, said removable means capable of being loosely applied and still precluding said movements.

2. In combination:
   a pipeline device having a body defining a circumferential groove;
   a split ring positioned in said groove;
   a loosely mounted flange secured to said body by said split ring;
   removable means for securing said flange in position on said body, said securing means comprising a pair of matching bosses on said flange and said body, respectively; and
   means for maintaining said bosses in alignment to preclude both lateral and rotational movement therebetween.

3. The combination of claim 2 wherein said maintaining means comprises a generally U-shaped retainer having an aperture therein;
   a mating aperture formed in one of said bosses; and
   a fastener mounted in said aperture and secured in said mating aperture.

4. A valve body having a flange loosely secured thereto, said flange being capable of relative rotational and limited lateral movement with respect to said valve body;
   a first generally rectangular boss on said valve body;
   a second generally rectangular mating boss on said flange, said bosses being juxtaposed each other in one orientation of said flange and said body;
   a U-shaped retainer device, having a U-shaped cross-section throughout the extent thereof, straddling said first and second bosses and maintaining said flange and said body in said one orientation; and
   fastener means for securing said retainer device in position.

5. The apparatus of claim 4 wherein said fastener means includes:
   a threaded aperture formed in said first boss;
   a hole formed in the bight portion of said U-shaped retainer device; and
   a bolt passing through said hole and engaging said threaded aperture.

* * * * *